United States Patent [19]
Nario et al.

[11] Patent Number: 5,914,713
[45] Date of Patent: Jun. 22, 1999

[54] ACCESSING DATA FIELDS FROM A NON-TERMINAL CLIENT

[75] Inventors: Jorge E. Nario, Westborough, Mass.; Michael W. Levine, Salem, N.H.

[73] Assignee: FMR Corp., Boston, Mass.

[21] Appl. No.: 08/716,726

[22] Filed: Sep. 23, 1996

[51] Int. Cl.$^6$ .................................................. G06F 13/00
[52] U.S. Cl. ...................... 345/335; 345/334; 395/200.33
[58] Field of Search ........................... 395/200.33, 200.5, 395/200.72, 326, 333, 335; 707/4; 364/282.1, 283.3; 345/334

[56] References Cited

U.S. PATENT DOCUMENTS

| | | | |
|---|---|---|---|
| 3,599,158 | 8/1971 | Huddinge et al. | 395/732 |
| 5,036,484 | 7/1991 | McCoy et al. | 395/500 |
| 5,457,797 | 10/1995 | Butterworth et al. | 395/682 |
| 5,530,961 | 6/1996 | Janay et al. | 345/334 |
| 5,566,330 | 10/1996 | Sheffield | 707/4 |
| 5,673,403 | 9/1997 | Brown et al. | 345/335 |

*Primary Examiner*—William M. Treat
*Assistant Examiner*—David M. Ovedovitz
*Attorney, Agent, or Firm*—Fish & Richardson, P.C.

[57] ABSTRACT

Information organized in fields stored by a mainframe computer database program is retrieved in field format by software running on the mainframe computer to extract the information by intercepting the information after causing the database program to execute an existing routine for preparing to display the information. The retrieved information in field format is then delivered to software such as a GUI software application, an Internet browser application, or another database program, or is used to produce a display on an output device such as a pager or a fax machine. Information is also stored in the fields by inserting the information in field format in a map and causing the database program to execute an existing routine for reading the information from the map. The inserted information in field format is provided by software such as a GUI software application, an Internet browser application, or another database program, or is derived from input data provided by a hardware device such as a pager or a fax machine.

29 Claims, 9 Drawing Sheets

Microfiche Appendix Included
(1 Microfiche, 16 Pages)

```
    ⋮

┌─────────────────────────────────────────────────────────────────────┐
│ IF (EIBTRNID EQUAL 'CSMI' OR 'CPMI') AND EIBTRMID (1:1)='!'         │
│      PERFORM 8900-BUILD-TEMP-STORAGE-MAP  THRU 8900-EXIT            │
│ ELSE                                                                 │
│   ┌──────────────────────────────────────────────────┐              │
│   │ EXEC CICS SEND                          11       │              │
│   │      MAPSET  ('FBMS206')                         │              │
│   │      MAP     ('FBMP206')                         │              │
│   │      FROM    (FBMP206O)                          │              │
│   │      CURSOR                                      │              │
│   │      ERASE                                       │              │
│   │      RESP    (CICS-RESPONSE)                     │              │
│   │      END-EXEC                                    │              │
│   └──────────────────────────────────────────────────┘              │
│ END-IF                                                               │
└─────────────────────────────────────────────────────────────────────┘

⋮  FIG. 2
    ⋮

┌─────────────────────────────────────────────────────────────────────┐
│ IF (EIBTRNID EQUAL 'CSMI' OR 'CPMI') AND EIBTRMID (1:1)='!'         │
│      PERFORM 8800-BUILD-TEMP-STORAGE-MAP  THRU 8800-EXIT            │
│ ELSE                                                                 │
│   ┌──────────────────────────────────────────────────┐              │
│   │ EXEC CICS SEND                          13       │              │
│   │      MAPSET  ('FBMS206')                         │              │
│   │      MAP     ('FBMP206')                         │              │
│   │      INTO    (FBMP206I)                          │              │
│   │      RESP    (CICS-RESPONSE)                     │              │
│   │      END-EXEC                                    │              │
│   └──────────────────────────────────────────────────┘              │
│ END-IF                                                               │
└─────────────────────────────────────────────────────────────────────┘

⋮  FIG. 3
```

ACCESSING DATA FIELDS FROM A NON-TERMINAL CLIENT

REFERENCE TO MICROFICHE APPENDIX

A microfiche appendix forms part of this application. The appendix, which includes a source code listing relating to an embodiment of the invention, includes 16 frames on 1 microfiche.

This patent document (including the microfiche appendix) contains material that is subject to copyright protection. The copyright owner has no objection to the facsimile reproduction by anyone of the patent document as it appears in the Patent and Trademark Office file or records, but otherwise reserves all copyright rights whatsoever.

BACKGROUND OF THE INVENTION

The invention relates to database software, and particularly to databases residing on mainframe computers.

Large, mission-critical databases such as those used in the financial services industry still reside primarily on mainframes (e.g., the IBM® 3090 running applications written for IBM CICS/NVS software). Efforts have been underway for several years to move these databases to client/server architectures, in which fault-tolerant enterprise servers (e.g., Oracle® database software running on a Pyramid server) communicate over local area networks with clients (e.g., Pentium® class PCs) running graphical user interfaces (GUIs). Conventional wisdom has been that moving databases to client/server architectures will reduce costs, as enterprise server hardware tends to be less costly than mainframe hardware. The other major motivation for moving to enterprise servers has been to provide users with GUI clients, which are a more user-friendly interface than the IBM 3270 terminal interface typically used with mainframes.

Not uncommon today is a three-tier architecture, in which a GUI client communicates with an enterprise server, which, in turn, communicates with a mainframe. Typically, the mainframe is running legacy software (e.g., written in COBOL) that handles the core data of the application. Additional data and editing of mainframe data are handled by the enterprise server. Data is downloaded from the mainframe (e.g., in nightly batches) to the enterprise server, and from there made available to the user via the GUI client.

Although mainframes are still dominant, changes have occurred at the user's desktop. At the time that today's mainframe software was written, users typically ran only mainframe applications, and did all of their computing via terminals, the most common of which was the IBM 3270. But as desktop computing became commonplace (e.g., with the appearance of desktop word processing and spreadsheet software), the terminal was largely replaced with terminal emulation software (or hardware/software hybrids) running on the user's desktop computer. But such terminal emulation produced the very same character-based interface provided by the original terminal.

Each screen map appearing on a mainframe terminal or terminal emulation is produced by the mainframe software. For example, data is exported to the terminal via a SEND MAP instruction written in COBOL, and data is received via a RECEIVE MAP instruction. At that point in the program execution, a logical map containing the data fields is mapped into a physical or character map that contains the data plus a variety of screen attribute commands (e.g., color, underlining). Only the character maps are sent to the terminal.

Efforts have been made towards replacing this character-based terminal interface with a GUI. Much of the investment in conversions to client/server architecture has been driven by the desire to provide the user with a GUI.

Screen scraper software has been used to create GUIs from the character maps sent to the terminals, but without a great deal of success. Using a screen scraper to do the conversion depends on absolute accuracy of transmission of the character maps. A single character lost in transmission (as can happen particularly with software emulations, which lack the error checking of the original terminal) can result in a lockup (i.e., a complete failure requiring re-starting) of the screen scraper software or in all of the data on the GUI being erroneous. The same outcomes can result from making a minor change to the mainframe software, as a change may slightly shift the location of data fields in the character maps.

GUIs produced using screen scraping are also typically limited to presenting information appearing on a single character map received from the mainframe. Adding additional data fields not stored on the mainframe, or combining data appearing on different character maps, has required moving the database to a client/server architecture.

SUMMARY OF THE INVENTION

We have discovered a cost effective technique for directly accessing software such as mainframe legacy software, one that can readily provide a rich graphical user interface (GUI) at the client, with access speeds comparable or better than achievable with most enterprise server architectures.

Unintrusive modifications are made to the mainframe software to interrupt execution of a mainframe routine at a point at which data fields are being transferred to/from the character map used for terminal displays. The data fields are copied to/from a buffer that can be accessed by the client over a communications link. By accessing the data fields in this way, the invention makes it possible to achieve as rich a client GUI as can be achieved with conventional client/server architectures, and at considerably lower development cost. The difficulties associated with GUIs based on screen scrapers are avoided. In the simplest architecture, the clients communicate directly with the mainframe, using a common communication protocol such as TCP/IP; data packets containing data fields are sent back and forth from the mainframe to the client, where they are assembled and presented in a GUI. By assembling data fields from a plurality of calls to different mainframe software functions (and intercepting data fields from each), the GUI is able to present combinations of data fields not possible with a terminal interface or a screen-scraper based GUI.

Servers may be employed in the communication path between the mainframe and the clients. The servers may function as concentrators to assemble or break apart data packets on their way to and from the mainframe. Database servers may also be provided, for achieving real time (or near real time) assembly of mainframe data with server data (or editing of mainframe data by the server).

The invention can extend the useful life of legacy mainframe software applications, deferring or eliminating the need to move the applications to enterprise server architectures. The modifications required to the mainframe software can be done quickly, and in a manner that makes their presence transparent to subsequent modifications and recompiles of the software.

In general, in one aspect, the invention features: interrupting execution of a computer (e.g., mainframe) software routine at the point at which data fields are transferred to/from a character map; copying the data fields to/from a buffer; and providing access to the buffer from a non-terminal client (i.e., a client such as a desktop computer running a GUI that is not dependent on communicating with a computer via character or page maps).

Embodiments of the invention may incorporate one or more of the following features:

Interrupting execution of the routine may comprise executing an instruction(s) inserted into the code of the routine that branches to an instruction(s) also in the routine that copies the data fields to/from a buffer. Alternatively, interrupting execution of the program may comprise executing a software module external to the routine when the routine reaches a hook corresponding to the point at which data fields are transferred to/from a character map.

A plurality of different mainframe software routines may be initiated, so that groups of data fields from each are copied to one or more buffers, access is provided to each buffer from the non-terminal client, and at least one data field from each of the plurality of groups copied to buffers are combined to form a GUI display.

Instructions may be provided to determine the terminal or non-terminal nature of a client accessing the mainframe, and the copying of data fields into the buffer may be performed for non-terminal clients; and the transfer of data fields into a character map performed for terminal clients.

Transfer of data fields to a character map may comprise copying the contents of the data fields from a data exchange area to the character map.

Copying of data fields to the buffer may comprise copying the contents of the data fields from the data exchange area to the buffer.

All of the data fields normally transferred to the character map, or just selected fields, may be copied to the buffer and made accessible by the non-terminal client.

Access to the data fields copied to the buffer may be had via several communication architectures. There may be a direct connection between the non-terminal client and the mainframe (e.g., by transmission of TCP/IP data packets across a network connection between the mainframe and a plurality of clients). Alternatively, access may be had via a server intermediate (i.e., logically disposed between) the client and the mainframe.

A database server may also be provided intermediate the mainframe and the non-terminal client, and the client may have access to data fields on the database server as well as data fields in the buffer on the mainframe. And the database server may edit data fields accessed from the buffer on the mainframe.

The client may have access to data fields in the buffer on the mainframe via a browser running on the client that accesses a web server that, in turn, accesses the buffer on the mainframe.

Access to the buffer may include both transfers of data from the client to the buffer as well as transfers from the buffer to the client. Following a transfer of data from the client to the buffer, data is written from the buffer to data fields at the point in the program at which information would have normally been transferred from a character map to the data fields.

Accesses by the client to the mainframe may be synchronous as well as asynchronous.

There may be a plurality of mainframes, and the steps of invention may be carried out on each, so that the client may access data fields from each of the mainframes.

Interrupting execution of the mainframe software routine may be achieved by executing a conditional branch instruction, such as an IF instruction, to determine whether a non-terminal client has initiated execution of the software routine, and if so branching to instructions that copy the content of the data fields to the buffer.

Accesses by the client may comprise executing a call to interface software running on the client to organize a data packet having designated data areas to be filled with data fields from the buffer, and causing the data packet to be sent by communication software to the mainframe.

Accesses to the buffer may be carried out using communication software that has a size limit on the maximum number of bytes that can be transferred from the mainframe computer to the desktop computer, and more bytes than the maximum may be transferred by breaking the transfer into segments smaller than the size limit.

The technique may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the method described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other features and advantages of the invention will be apparent from the following description of preferred embodiments and from the claims.

BRIEF DESCRIPTION OF THE DRAWINGS

FIGS. 2, 3 are source code listing excerpts from a modified database application program.

DESCRIPTION OF THE PREFERRED EMBODIMENTS

Figure 1:
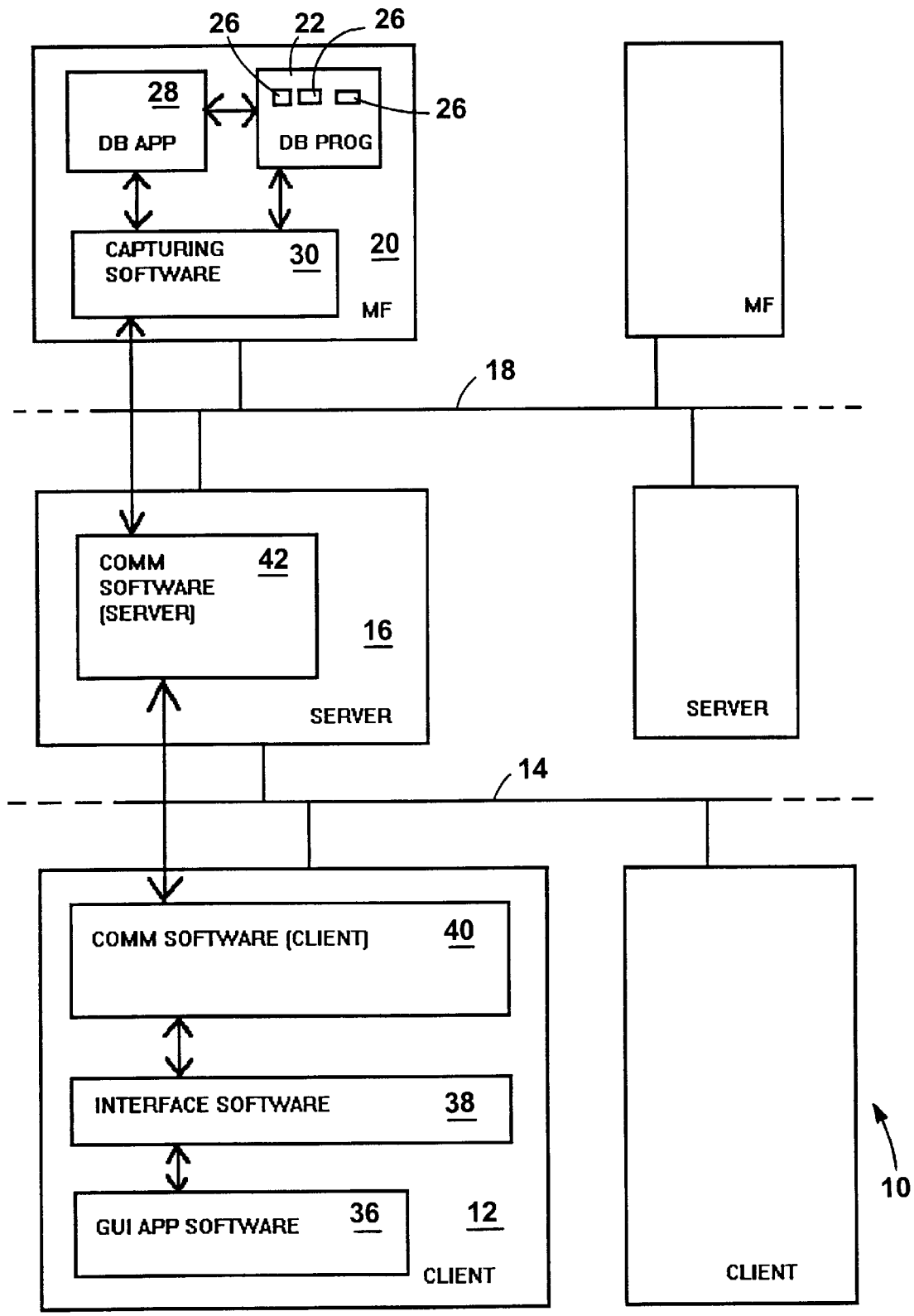
FIG. 1 is a block diagram of a distributed computing database system.

FIG. 1 illustrates a distributed computing system 10 having a local non-terminal client computer 12 connected across a client-server network 14 to a server computer 16 providing access across a mainframe link 18 to a mainframe computer 20. The client computer is preferably a desktop (i.e., personal) computer running an operating system such as Microsoft® Windows® 3.1 or Microsoft® Windows®95. The server computer may be a personal computer or a server-class computer such as an IBM® RS6000 running an operating system such as IBM® OS/2 or AIX. The mainframe computer may be an IBM® 3090 running an operating system such as IBM® MVS 5.2.

The mainframe computer runs a database program 22 such as IBM® CICS/MVS 3.1. Information stored by the database program is organized into database data fields 26. Also running on the mainframe is a database application program 28 such as a customer financial information application. The database application program gains access to the fields via the database program. In the case of the customer financial information application, the contents of the fields includes information about a financial account of a customer. For example, each field contains a piece of information such as the customer's last name, the customer's first name, the customer's account number, the customer's telephone number, the total value of the customer's assets, and the like.

To a user of the database application program without modification or enhancement, the database application program makes the information of the fields available only in character maps. Each character map corresponds to a page or screen appearing on a computer terminal such as an IBM® 3270. For example, in the case of the customer financial information application, the user may select a character map corresponding to a "BNAM" routine provided by the application. The "BNAM" routine provides access to contact information and related information about the customer. The "BNAM" character map is derived from many fields including fields containing the customer's name and address. However, the information is in a richer form as a field than in a character map. The field is richer because the field is able to store long numbers and exponential numbers elegantly and is able to adapt easily to changes in lengths of text strings and the like. Conversion of the information to character maps tends to result in a loss of accuracy for numerical fields and awkward truncation for text strings of variable lengths.

To make the information available in fields, the mainframe computer also runs capturing software 30. The capturing software includes intercept software and supporting software. The intercept software provides the supporting software with the ability to gain access to and update information contained in fields. As described in more detail below, the intercept software so provides for such access by intercepting the information just before the information is to be sent for display on a terminal. The supporting software is then able to pass this information on for use by various types of applications, as also described below. The ability to update is similarly provided by intercepting the database application program's process of storing information using the database program.

The intercept software is provided in one of two versions, each of which works in a different way, depending on the database application program involved. Use of the first version is most appropriate when it is possible to edit and compile the source code for the database application program. Preferably, the second version is used when such editing and compiling is not available.

The first version of the intercept software works by running as part of the database application program. The intercept software is made up of program instructions added to the source code of the database application program. To make this first version work, the additional instructions are inserted in the source code, and the source code is compiled to produce a modified database application program. For example, if the database application program's source code is compatible with IBM® MVS/COBOL Command Level version 2, the additional instructions 11, 13 appear as shown in FIGS. 2 and 3. Equivalent instructions may be used with other programming languages such as Fortran, C, or Pascal. Preferably, no other modifications are made to the source code of the database application program. FIG. 2 relates to extracting information from fields for later use and FIG. 3 relates to inserting information into fields for storage using the database program. In FIG. 2, a conditional branch instruction, specifically an "IF" additional instruction, is inserted before a "SEND" existing instruction. The "SEND" existing instruction, if executed, causes the database program to generate and display a character map of data corresponding to a particular group of fields, as noted in the example above citing the "BNAM" routine. The "IF" additional instruction tests whether preparation for displaying the "BNAM" character map, for example, was initiated by the supporting software, as described below. If the preparation was so initiated, the "IF" additional instruction suppresses the execution of the "SEND" existing instruction and instead causes execution of a software routine "FWINMAP" of the supporting software. As described below, the routine "FWINMAP" is able to copy information from a targeted database field for later use. The "FWINMAP" routine is preferably written in assembly language for optimum speed of execution. The assembly language source code for the "FWINMAP" routine is attached and is compilable using an IBM® BAL Assembler.

In FIG. 3, to allow updating of the information of a field, an "IF" additional instruction is inserted before a "RECEIVE" existing instruction. If executed, the "RECEIVE" existing instruction causes the database program to update a field with information expected to have originated in a character map of information sent from a 3270 terminal. As discussed above with respect to the "SEND" existing instruction, the "IF" additional instruction tests whether the supporting software is involved. If so, the "IF" additional instruction suppresses the execution of the "RECEIVE" existing instruction. Instead, the software routine "FWINMAP" executes to copy updated information to the field before information for the field is stored using the database program.

Unlike the first version of the intercept software, the second version does not alter the existing database application program. Instead, the second version of the intercept software resides outside the database application program, with the supporting software. Hooks or exits provided in accordance with the database program are used to allow the second-version intercept software to provide the same functionality described above for the first version. The hooks in the database program allow an external software routine, here the "FWINMAP" routine, to execute before a "SEND" instruction or before a "RECEIVE" instruction. When the second version is used, the intercept software gains access to the fields via a logical map data exchange area provided by the database application program for use by the database program. Before a "SEND" instruction is executed, the database application program fills the data exchange area with information for fields to be displayed using the character map requested, such as the character map generated by the "BNAM" routine. The database program then copies information from the data exchange area to make a character map of data for sending to the terminal. For example, in the case of the "BNAM" routine, the data exchange area contains information for name and address fields, among other fields. Therefore, when called via a hook preceding execution of the "SEND" instruction, the intercept software is able to copy information from a targeted field by referring to the data exchange area. Again, as discussed below, this information is then passed on for later use.

Similarly, when the second-version intercept software is involved in updating the information of a field, the intercept software is invoked via a hook just before a "READ" instruction is executed by the database program. In the case of updating, the intercept software refers to the data exchange area for the purpose of inserting updated information for a targeted field so that the database program will store the updated information.

As noted above, the intercept software relies on the supporting software. The supporting software not only provides the "FWINMAP" routine mentioned above, but also causes the database application software to execute the database routines, such as "BNAM", that provide access to the fields of the database program. The "FWINMAP" routine is used in two modes: (1) for retrieving information from a targeted field and (2) for updating information for a targeted field. As shown in FIGS. 2 and 3, the mode is selected by executing the appropriate call instruction. The call instruction "BUILD-TEMP-STORAGE-MAP" (FIG. 2) indicates that the "FWINMAP" routine is being called for purposes of information retrieval. Similarly, the call instruction "READ-TEMP-STORAGE-MAP" (FIG. 3) indicates the "FWINMAP" routine is being called for purposes of updating information. In both modes, the "FWINMAP" routine preferably uses a temporary data storage area (such as IBM® CICS/MVS's "commarea") known as a common area or a buffer and provided by the database program. The common area has a maximum size (i.e., size limit) such as 32K bytes, but information exceeding that size is able to be handled by the supporting software by breaking the information up into pieces or segments not exceeding the maximum size.

In the retrieval mode, the "FWINMAP" routine copies information from a targeted field to the common area. As described below, the information in the common area is later sent in a data packet communicated outside the mainframe computer to provide access to the information of the targeted field. In the updating mode, the "FWINMAP" routine copies information to the targeted field from the common area where the information was previously inserted. Alternatively, the "FWINMAP" routine does not use the common area and instead uses a memory storage area set aside by the "FWINMAP" routine itself, not by the database program.

As mentioned above, the supporting software performs other functions, usually invoked via hooks provided by the database program. For example, given a request for retrieval of information from a field corresponding to a particular routine such as "BNAM", the supporting software initiates the database application program's generation of the information, by invoking the "BNAM" routine. This initiation eventually leads to the intercepted "SEND" instruction noted above and the intercept software's calling of the "FWINMAP" routine for copying the information from the field to the common area. In addition, with respect to the supporting software, the database application program providing the field's information may be running on a different mainframe or on the same mainframe but in a different protected resource region such as a different address space or address region. If so, the supporting software also uses a distributed program link ("DPL") to the different mainframe or region to gain access to the database application program.

Another important function of the supporting software relates to data type conversions between the field information of the database application program and the field information as stored in the common area. The supporting software converts delimiters such as carriage returns and end-of-file markers and also handles mixed data types. For example, if the updated information for a particular field having a character data type appears in the common area in a packed data type, the supporting software converts the packed data type to the character data type.

Finally, when the supporting software initiates a retrieval or updating of information, the supporting software makes two settings used as flags by the "IF" clause mentioned above to detect that the supporting software was the initiator. The first setting identifies the retrieval or updating as a transaction of type "CSMI" or "CPMI" (type identifiers provided by the CICS program), indicating that the transaction involves a mainframe-to-mainframe interaction or an RS-6000-to-mainframe interaction, respectively. The second setting provides a false indication to the database application program that a terminal is connected and is necessary to avoid producing an error condition due to lack of initiation by an actual terminal. The false terminal has an identifier starting with an exclamation point ("!"). Consequently, the "FWINMAP" routine is called only if the transaction type is identified as "CSMI" or "CPMI" and the terminal's identifier starts with an exclamation point.

Figure 9:
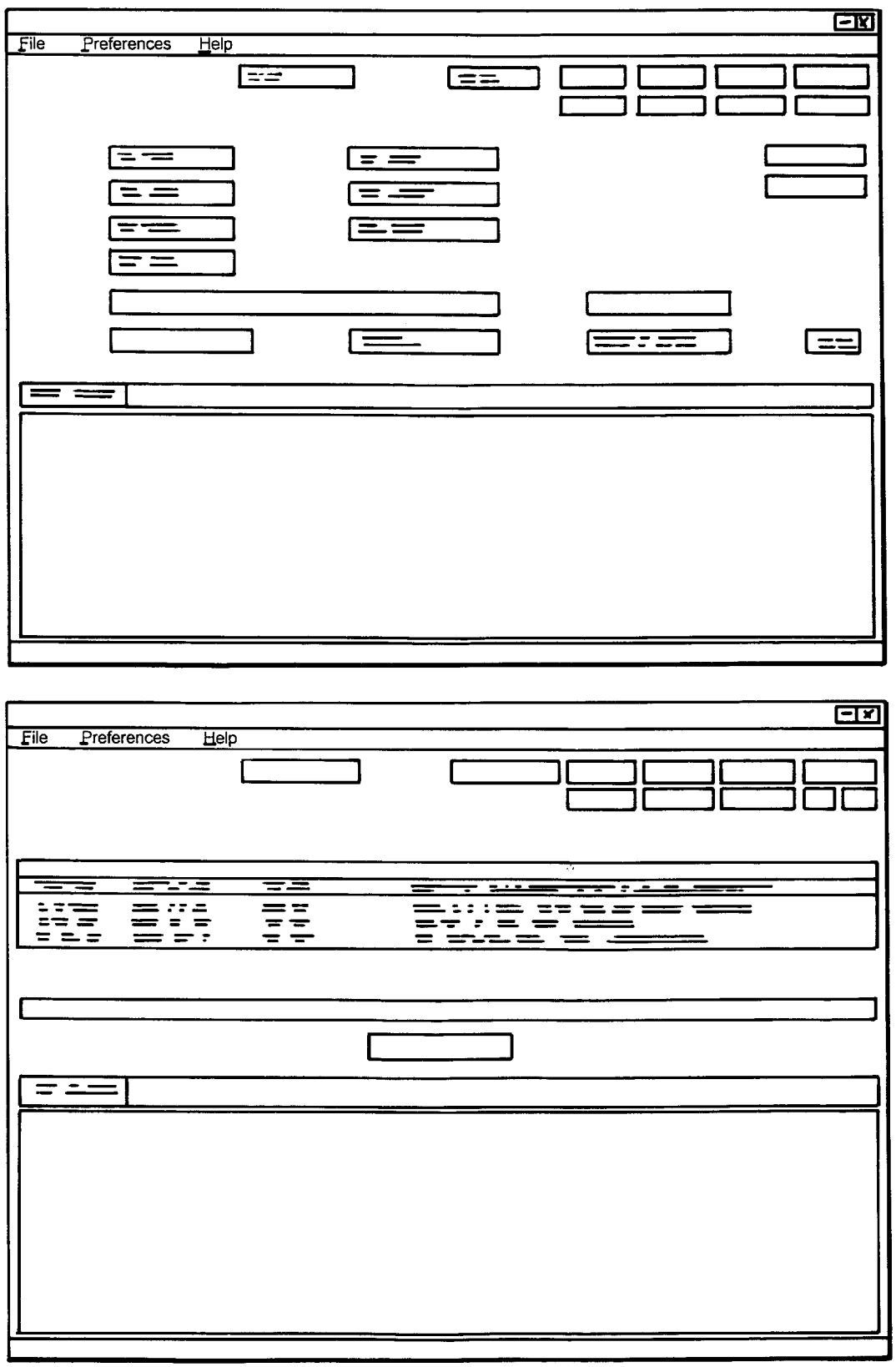
FIG. 9 is an illustration of GUI computer screens.

Thus the supporting software and the intercept software make up capturing software providing access to fields stored by the database program. As shown in FIG. 1, this access is used by the client computer 12 running graphical user interface ("GUI") application software 36, such as the application software producing screens illustrated in FIG. 9. The GUI application software is preferably written in Microsoft® VisualBasic® 3.0 or 4.0 or Microsoft® C++ 2.0 or 4.0. In fact, any application that can be configured as a Windows® application can take advantage of this access to the fields. The GUI application software need not be significantly powerful and may be limited to displaying information from various fields on the screen of the client computer.

Figure 4:
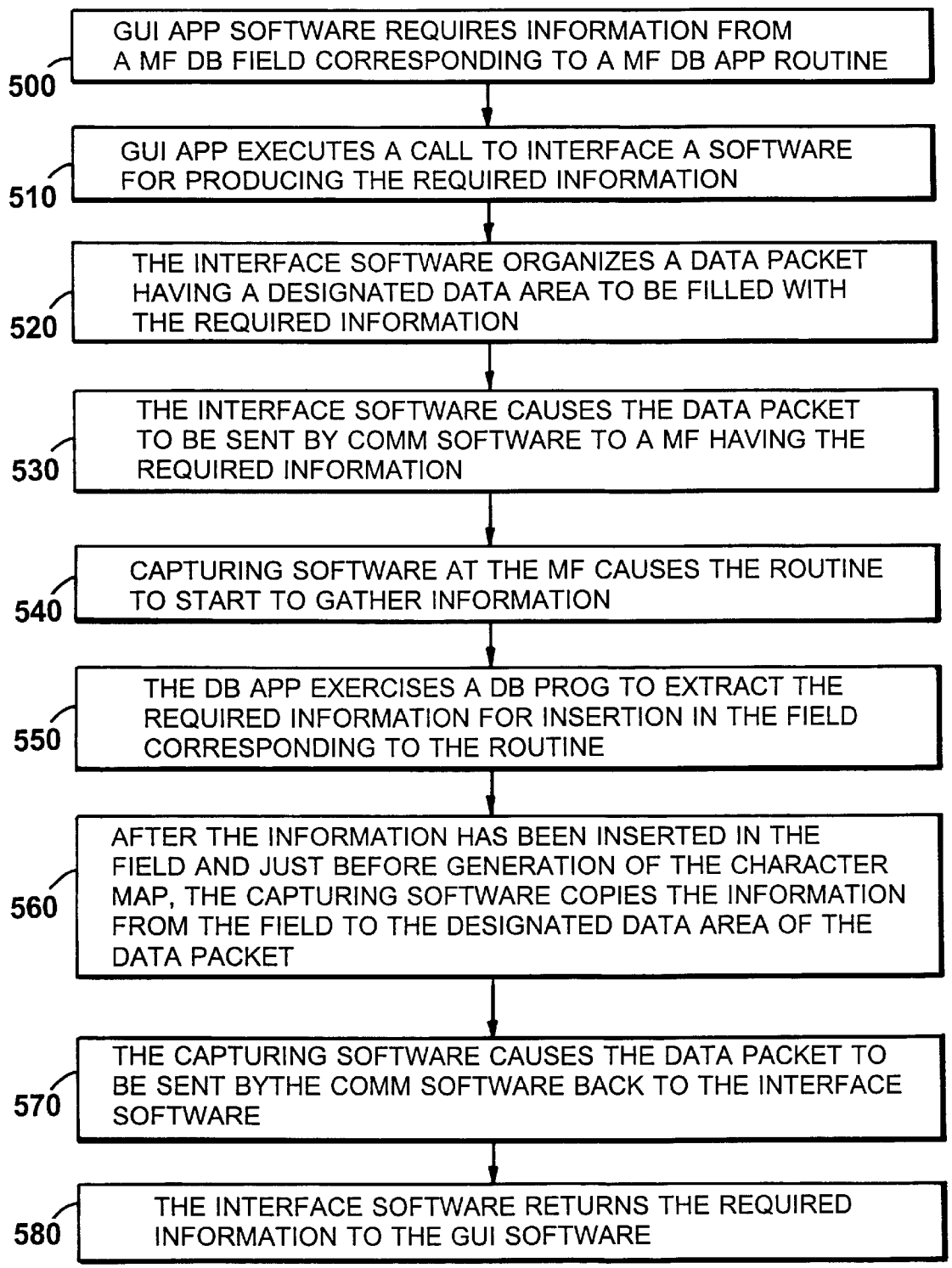
FIGS. 4, 5 are flow diagrams of methods of gaining access to database information.

Examples of GUI application software making use of this access include login programs, order-entry programs, configurable graphs of stock performance over time, and portfolio analysis programs. Referring also to FIG. 4, for retrieving information, the access to the fields is driven by the GUI application software requiring information from a mainframe database field corresponding to a mainframe database routine as noted above (step 500). The GUI application software executes a call to interface software 38 (step 510). The interface software receiving the call has many routines available, preferably one per database routine such as "BNAM", for retrieving information from each database routine available from the database application program. Therefore, in the case of the customer financial information application noted above, to retrieve the address of a customer, the GUI application program simply calls the interface software routine for the "BNAM" database routine. Then the interface software routine returns information for all of the fields produced in the "BNAM" routine and the GUI application program extracts information from the address field.

The routines comprise either a dynamically linked library ("DLL") module stored as a file "FIDWIN.DLL" or an object-linking and embedding custom control ("OCX") module stored as a file "FIDWIN.OCX" and are thus made available to an application program by the operating system running on the client computer. Preferably the routines are provided in the OCX module because use of the OCX module allows multiple calls (i.e., accesses) to be processed asynchronously, i.e., allows an additional call to be made while one or more calls already made have not yet returned with the information requested. Unlike use of the OCX module, use of the DLL module requires processing of multiple calls in a synchronous fashion, i.e., does not allow an additional call to be made if a call already made has not yet returned with the information requested. As a result, asynchronous processing can often produce a result more quickly than synchronous processing. The quicker result occurs because the overall turnaround time for synchronous processing is the sum of the individual turnaround times for the individual calls, while the overall turnaround time for asynchronous processing may be as short as the longest individual turnaround time. Therefore, it is slow to use the DLL module for creating GUI application screens having information from fields representing more than one database routine (e.g., a field corresponding to "BNAM" and a field corresponding to another database routine). Such screens are more quickly generated using the OCX module because the calls may overlap in time.

How the DLL or OCX module retrieves the information for the field requested depends on the type of transaction involved, e.g., adding, changing, or deleting information; the version of the transaction, and the dynamic location of the on-line transaction processor ("OLTP").

The interface software then organizes a data packet corresponding to the common area and having a designated data area to be filled with the required information for the field (step 520). The organization of the data packet is dependent upon an interface-software-defined layout known as a "user-defined type" indicating the position and makeup of the fields to be transferred in the data packet. For example, for a last-name field, the user-defined type may indicate that the field is positioned at the beginning of the data packet and corresponds to a text string of 20 characters maximum.

Next, the interface software causes the data packet to be sent by the communications software 40, 42 to the mainframe (step 530). The communications software is preferably a IBM® CICS/Client program formatting the data packet into a TCP/IP or NetBIOS format for delivery to the capturing software at the mainframe. The communications software is preferably divided between a client instance 40 and a server instance 42. The client instance runs on the client computer and delivers the data packet to the server running the server instance for passing the data packet on to the mainframe. Preferably, the server instance is also responsible for converting between ASCII convention and IBM® EBCDIC convention for binary coding of typographical information. In addition, the server acts as a concentrator for allowing many client computers to connect to one mainframe through the server.

In the event of a failure in delivery of the packet either to the server or to the mainframe, the interface software restarts the process of causing the packet to be sent to the mainframe. In the case of the server failure, the interface software causes the communications software to attempt to send to a different server. Failure indications may include a non-zero or abend code response from the IBM® CICS/Client program.

After the packet is received at the mainframe and the capturing software is activated thereby via a hook in the database program, the database application program is directed by the capturing software to start the database routine, e.g., "BNAM", corresponding to the field having the information requested (step 540). The database application program retrieves the information by causing the database program to produce the information (step 550). After the information is provided in the field in preparation for producing a character map of screen data to be sent to a terminal, the capturing software acts as described above to intercept the information and copy the information to the designated data area of the data packet (step 560). The capturing software then causes the data packet to be returned to the interface software by the communications software (step 570). Finally, the interface software finishes processing the call from the GUI application software by returning to the GUI application software the information from the designated data area of the data packet (step 580).

Figure 5:
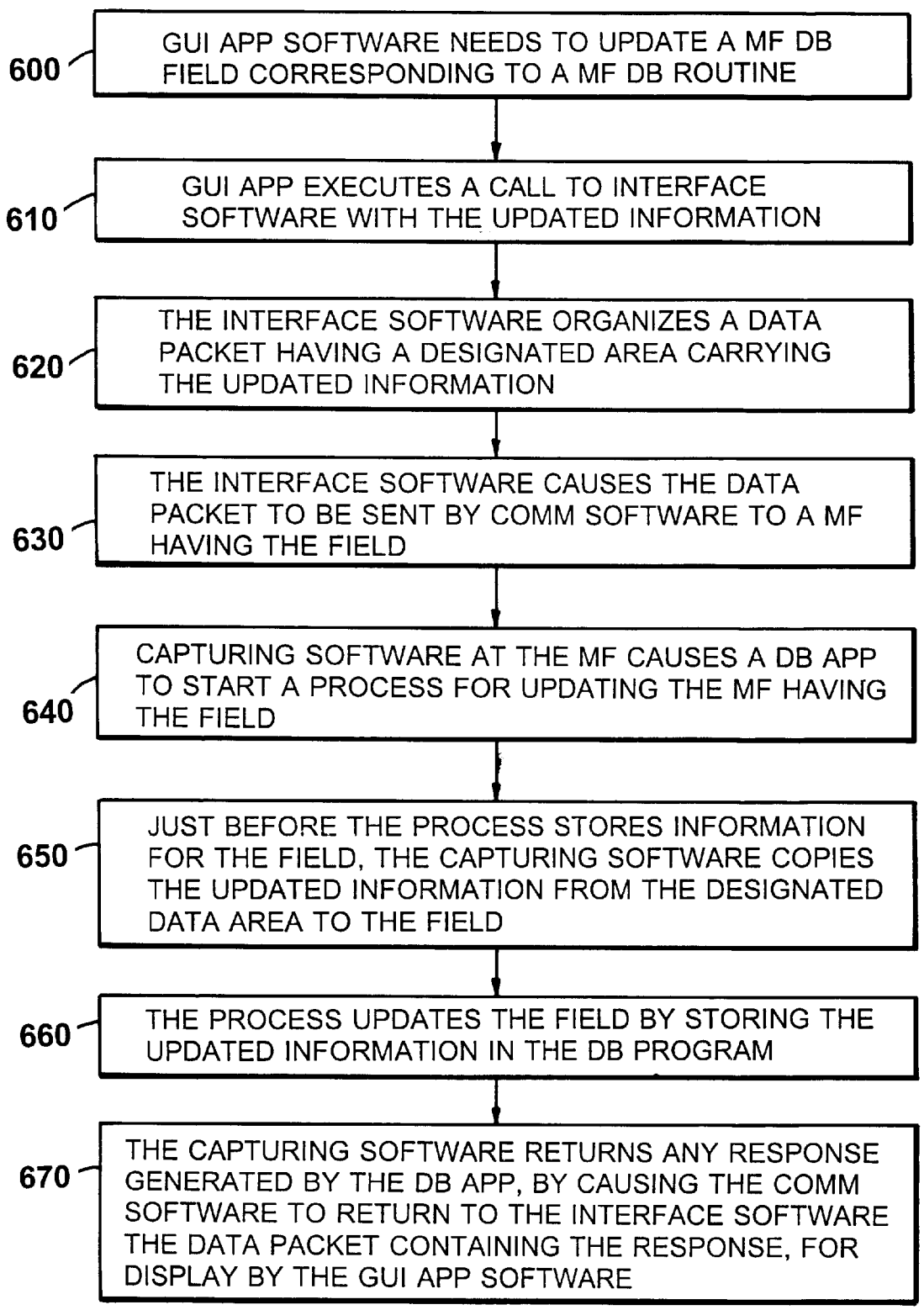

The process of updating a field is similar to the information retrieval process just described, and is illustrated in FIG. 5. First, the GUI application software develops a need to update a database field corresponding to a database routine such as "BNAM" (step 600). The GUI application executes a call to the interface software and specifies the updated information in the call (step 610). For example, if the updated information involves new address information, the new address information is presented to the interface software when the call is executed. Next, the updated information is stored in a designated data area of a data packet organized by the interface software (step 620). The interface software causes the data packet to be sent by the communications software, i.e., IBM® CICS/Client, to the mainframe computer and database program storing information for the field (step 630). At the mainframe, the capturing software causes the database application program to start a process of updating information for the field in the database program (step 640). Without the capturing software, especially the intercept portion of the capturing software, the database application program would update the database information for the field with information copied from a logical map derived from a character map corresponding to the terminal screen. Here, however, just before the updating process updates the database information for the field, the capturing software copies the updated information from the designated data area of the data packet to the field (step 650). Then the process updates the database information for the field by storing in the database program the contents of the field, i.e., the updated information just copied from the designated data area of the data packet (step 660). Finally, a response such as "CICS RETURN" generated by the database application program is returned to the GUI application software for display purposes by the interface software after the response is included in the data packet returned by the communications software to the interface software (step 670).

Figure 6:
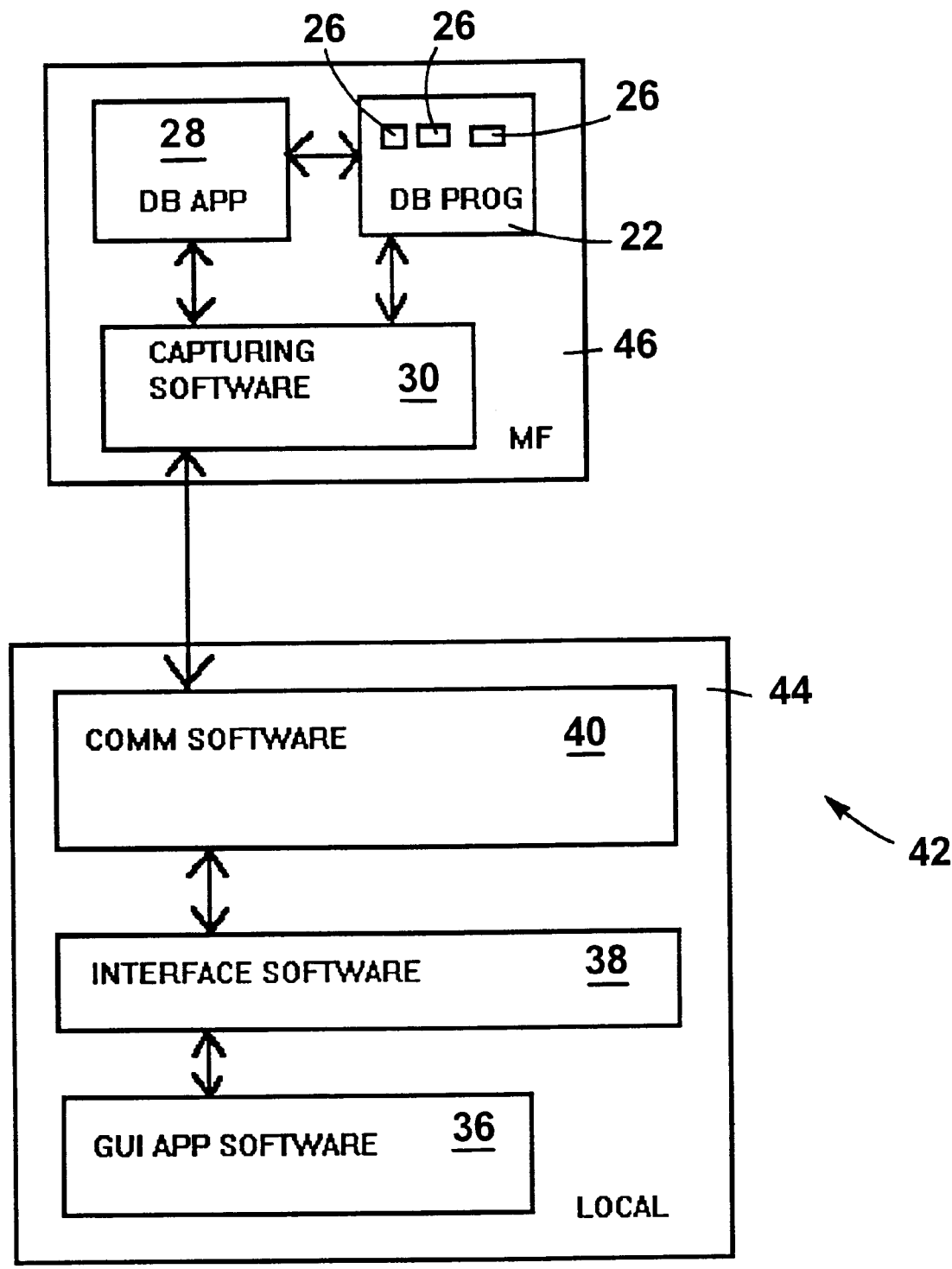
FIG. 6 is a block diagram of a distributed computing system having a mainframe computer connected to a local computer.

As shown in FIG. 6, the capturing software's ability to provide access to fields is also able to be used in a distributed computing system 42 lacking a server and connecting a client or local computer 44 directly to a mainframe computer 46 using a network protocol such as TCP/IP. The local computer runs the same software as the client computer 12 and the mainframe computer 46 runs the same software as the mainframe computer 20. In this case, the communications software 40 on the local computer provides a direct link between the interface software and the capturing software.

Figure 7:
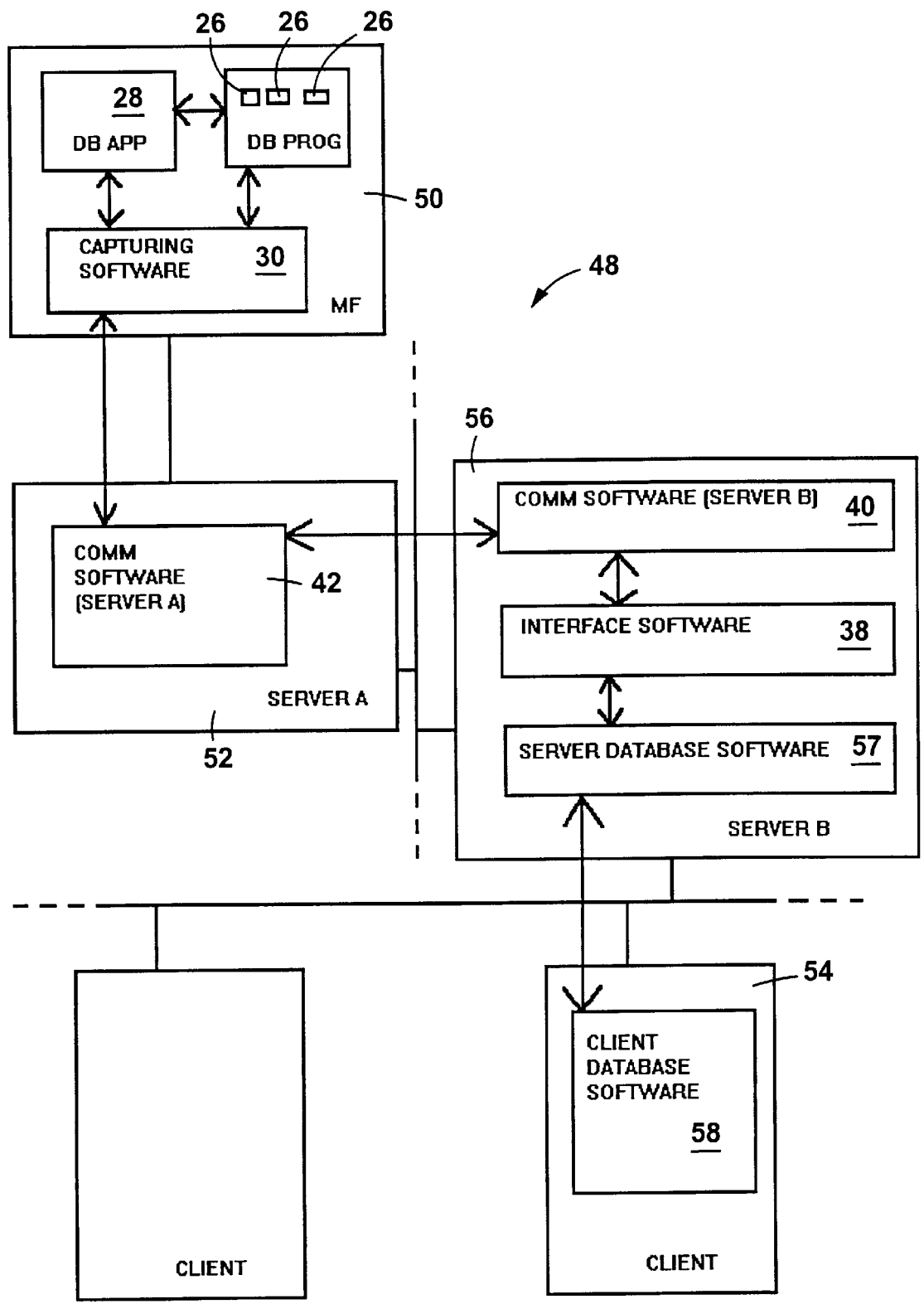
FIG. 7 is a block diagram of a distributed computing system having a mainframe computer connected to a client computer through two server computers.

FIG. 7 shows another type of distributed computing system 48 able to take advantage of access to fields. The system of FIG. 7 includes not only a mainframe computer 50, a server computer 52, and a client computer 54, but also a database software server 56 that runs server database software such as Sybase® software. Instead of running GUI application software, the interface software, and the communications software, the client computer 54 runs client database software 58 intended for use with the server database software. The interface software 38 and the communications software 40 run on the database software server 56 to provide the server database software 57 with access to the fields. In this case, for example, the server database software may use information retrieved from the fields to derive information to present at the client computer using the client database software. Furthermore, the server database software may store additional information such as information not available from the mainframe database software and may be configured to make changes upon request or automatically to information stored by the mainframe database software.

Figure 8:
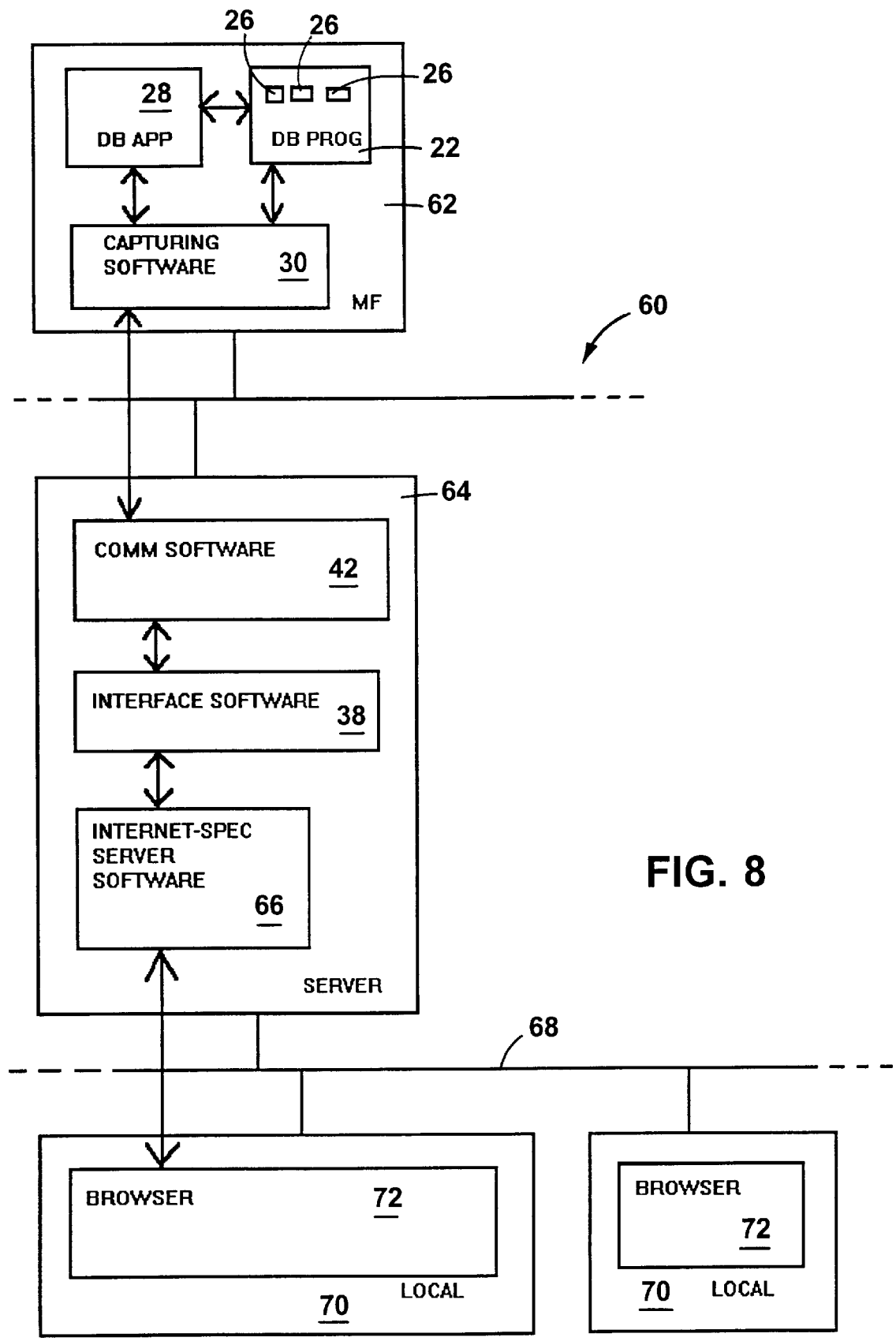
FIG. 8 is a block diagram of a distributed computing system having a mainframe computer connected through an Internet-specification server to a computer running an Internet-specification browser.
Figure 10:
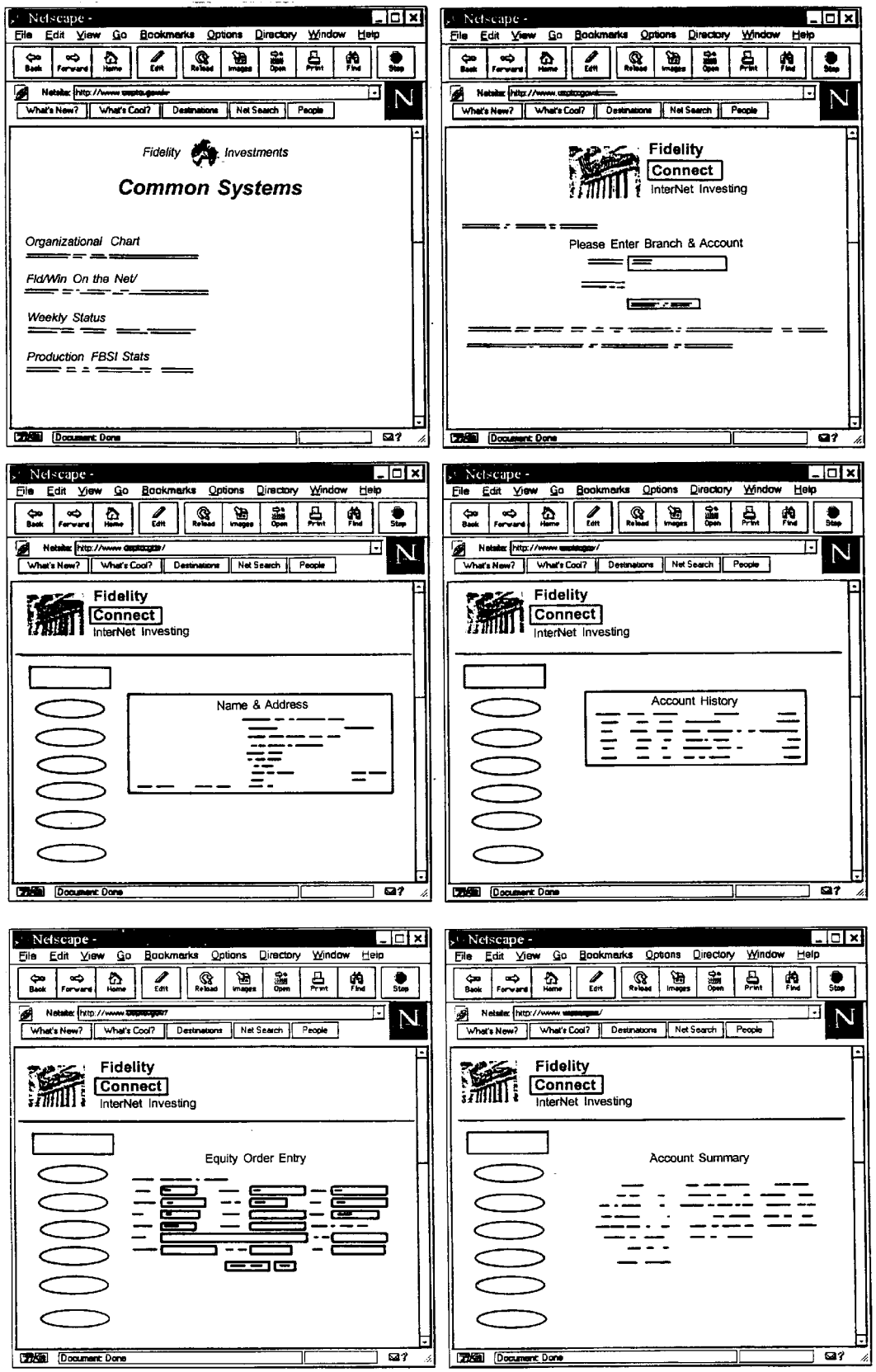
FIG. 10 is an illustration of browser screens.

FIG. 8 illustrates another distributed computing system 60 taking advantage of the access to fields provided by the capturing software 30. In this system, a mainframe computer 62 is configured similarly to the mainframe computer 20 in the system of FIG. 1. In this case, however, a server 64 runs not only the communications software 42 and the interface software 38, but also Internet-specification server software 66 such as Netscape® server software or Microsoft® server software. The server software may provide, for example, GUI Internet-specification screens known as World-Wide Web pages. One or more of the World-Wide Web pages may display and allow updating of information retrieved and derived using the access to the fields provided by the capturing software. Such information can include, for example, a customer's account information. Using the interface software, a CGI script program configured as a Microsoft® Windows® application is able to gain access to the fields and manipulate information from the fields for display in the World-Wide Web pages. The World-Wide Web pages, such as the pages illustrated in FIG. 10, are able to be viewed across an Internet-specification network 68 (e.g., the Internet or a local area network configured to allow Internet-specification data communication) on local computers 70 running Internet-specification browser software 72 such as Netscape® Navigator™ or Microsoft® Internet Explorer. In a case such as where a customer's account information is to be viewed across the Internet, the Internet server software and the browser software may also be configured to provide security to prevent unauthorized access to the customer's account information.

Other embodiments are within the scope of the following claims. For example, the information retrieved from the fields stored by the mainframe database program may be used not only with the client and local computers described above, but also with other types of non-terminal clients such as input and output devices operating over varied communications channels. These devices may include a pager in a paging system for, e.g., causing notification via the pager or producing a display on the pager. Information stored in fields by the mainframe database program may also be updated in response to input from the pager. For example, a financial-account customer carrying such a pager may be notified immediately about a buying or selling opportunity.

In addition, the information retrieved from the fields stored by the mainframe database program may be used with a telephone device such as a cellular telephone to allow use of tone dialing input to navigate a voice menu providing voice readouts derived from the information. Similarly, the same information may be used with a fax machine for, e.g., automatically producing reports via fax.

What is claimed is:

1. In a computer software application in which data fields stored on the computer are normally accessed by transmission of character maps corresponding to pages displayed on a terminal client, a computer implemented method for accessing the data fields from a non-terminal client, comprising:

initiating a software routine of the computer software application;

during execution of the software routine, interrupting the execution of the routine at the point at which data fields are transferred to/from a character map;

copying the data fields to/from a buffer; and providing access to the buffer from the non-terminal client.

2. The method of claim 1 wherein the computer is a mainframe computer.

3. The method of claim 2 wherein interrupting execution of the routine comprises executing an instruction(s) inserted into the code of the routine that branches to an instruction(s) also in the routine that copies the data fields to/from a buffer.

4. The method of claim 3 wherein a plurality of different mainframe software routines are initiated, groups of data fields from each are copied to one or more buffers, access is provided to each buffer from the non-terminal client, and at least one data field from each of the plurality of groups copied to buffers are combined to form a GUI display.

5. The method of claim 3 wherein interrupting execution of the routine is performed by executing a conditional branch instruction, such as an IF instruction, to determine whether a non-terminal client has initiated execution of the software routine, and if so branching to instructions that copy the content of the data fields to the buffer.

6. The method of claim 2 wherein interrupting execution of the program comprises executing a software module external to the routine when the routine reaches a hook corresponding to the point at which data fields are transferred to/from a character map.

7. The method of claim 2 wherein the non-terminal client is a desktop computer running GUI software that displays at least some of the data fields copied to the buffer.

8. The method of claim 7 wherein accesses by the non-terminal client comprise executing a call to interface software running on the client to organize a data packet having designated data areas to be filled with data fields from the buffer, and to cause the data packet to be sent by communication software to the mainframe.

9. The method of claim 2 wherein the terminal or non-terminal nature of a client accessing the mainframe is determined; the copying of data fields into the buffer is performed for non-terminal clients; and the transfer of data fields into a character map is performed for terminal clients.

10. The method of claim 2 wherein the transfer of data fields to a character map comprises copying the contents of the data fields from a data exchange area to the character map.

11. The method of claim 10 wherein the copying of data fields to the buffer comprises copying the contents of the data fields from the data exchange area to the buffer.

12. The method of claim 2 wherein all of the data fields normally transferred to the character map are copied to the buffer and made accessible by the non-terminal client.

13. The method of claim 12 wherein only selected ones of the data fields normally transferred to the character map are copied to the buffer and made accessible by the non-terminal client.

14. The method of claim 2 wherein access to the data fields copied to the buffer is made via a direct connection between the non-terminal client and the mainframe.

15. The method of claim 14 wherein the direct connection between the non-terminal client and the mainframe is provided by transmission of data packets across a network connection between the mainframe and a plurality of the non-terminal clients.

16. The method of claim 15 wherein the data packets conform to the TCP/IP protocol.

17. The method of claim 2 wherein access to the data fields copied to the buffer is made via at least one server intermediate the non-terminal client and the mainframe.

18. The method of claim 17 further comprising a database server intermediate the mainframe and the non-terminal client.

19. The method of claim 18 wherein the non-terminal client has access to data fields on the database server as well as data fields in the buffer on the mainframe.

20. The method of claim 18 wherein the database server edits data fields accessed from the buffer on the mainframe.

21. The method of claim 2 wherein the non-terminal client has access to data fields in the buffer on the mainframe via a browser running on the client that accesses a web server that, in turn, accesses the buffer on the mainframe.

22. The method of claim 2 wherein access to the buffer comprises transfers of data from the client to the buffer as well as transfers from the buffer to the client, and wherein following a transfer of data from the client to the buffer, data is written from the buffer to data fields at the point in the program at which information would have normally been transferred from a character map to the data fields.

23. The method of claim 2 wherein accesses by the client to the mainframe comprise synchronous accesses.

24. The method of claim 2 wherein accesses by the client to the mainframe comprise asynchronous accesses.

25. The method of claim 2 wherein there are a plurality of mainframes, and the steps of claim 1 are carried out on each, so that the non-terminal client may access data fields from each of the mainframes.

26. The method of claim 2 wherein accesses to the buffer are carried out using communication software that has a size limit on the maximum number of bytes that can be transferred from the mainframe computer to the desktop computer, and wherein more bytes than that maximum are transferred by breaking the transfer into segments smaller than the size limit.

27. The method of claim 2 wherein the non-terminal client has access to data fields in the buffer on the mainframe via a pager system accessing the buffer on the mainframe.

28. The method of claim 2 wherein the non-terminal client has access to data fields in the buffer on the mainframe via a voice menuing system accessing the buffer on the mainframe.

29. The method of claim 2 wherein the non-terminal client has access to data fields in the buffer on the mainframe via a faxing system accessing the buffer on the mainframe.

* * * * *